J. H. DAVIES.
TEAT CUP OF MILKING MACHINES.
APPLICATION FILED MAY 5, 1920.
1,365,665.
Patented Jan. 18, 1921.
2 SHEETS—SHEET 2.
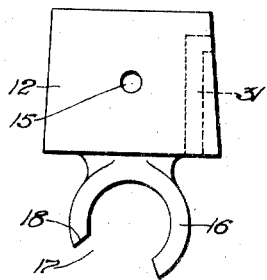
Fig. 11.
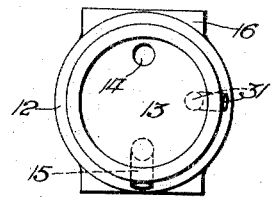
Fig. 12.
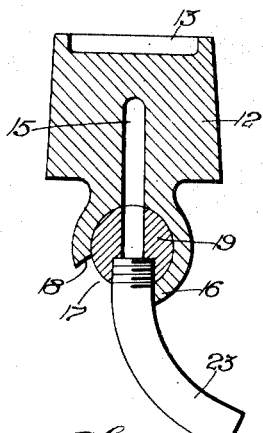
Fig. 13.
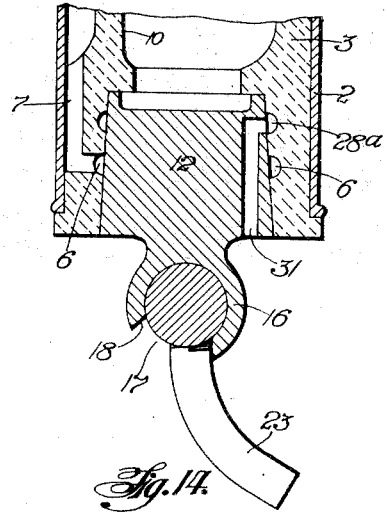
Fig. 14.
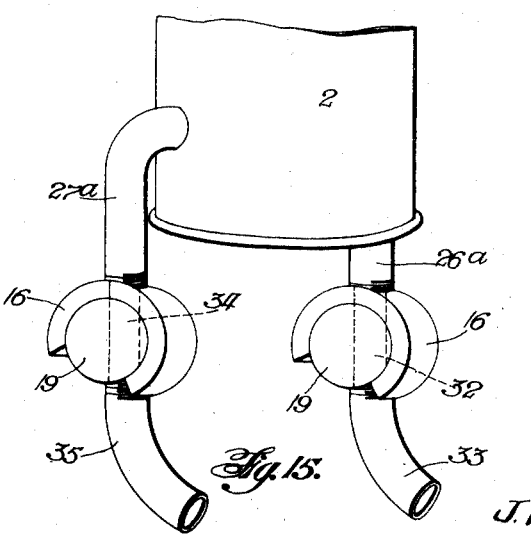
Fig. 15.
Inventor
J. H. Davies
by 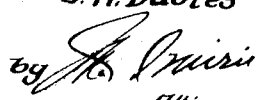
Atty

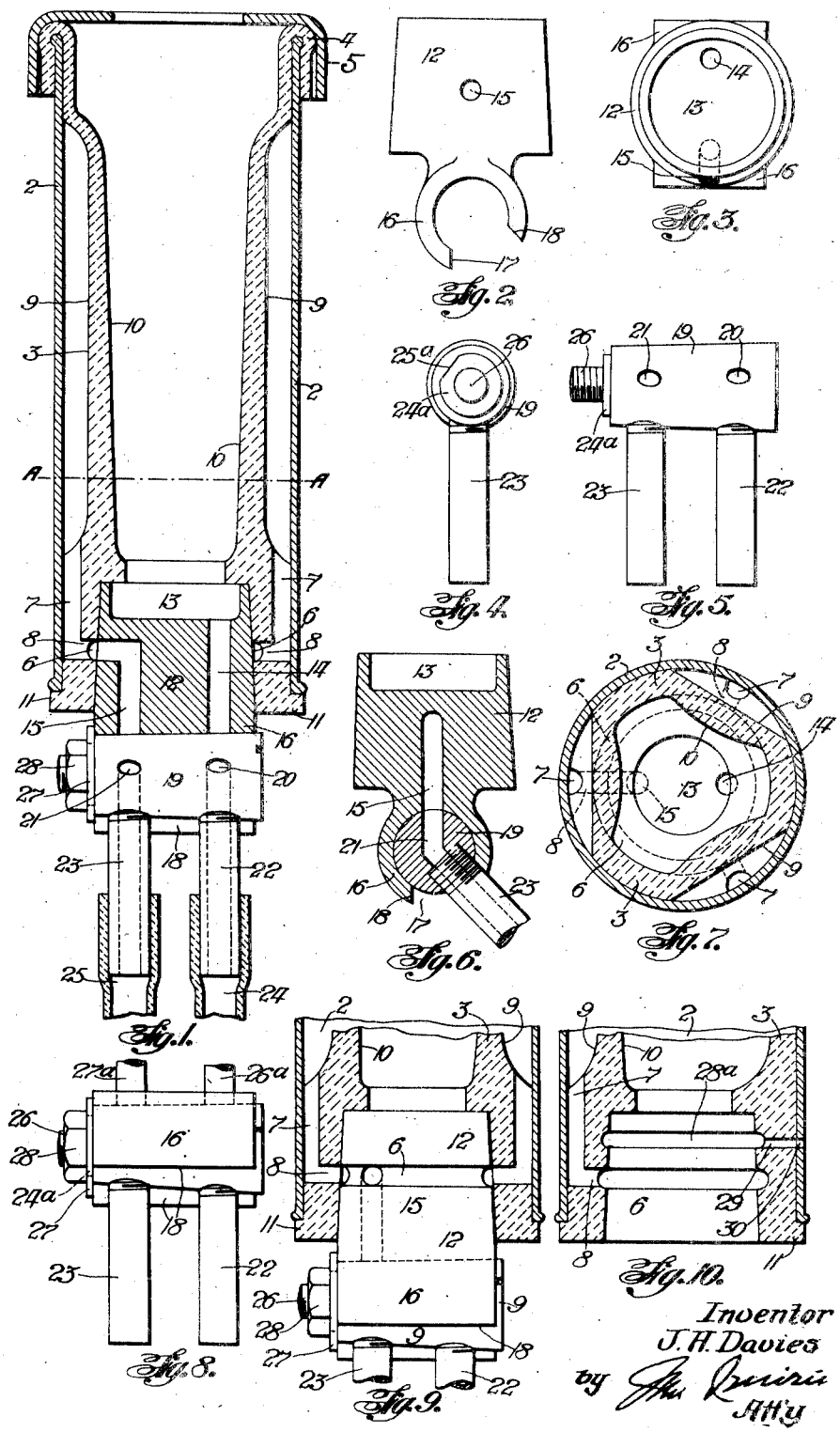

UNITED STATES PATENT OFFICE.

JOHN H. DAVIES, OF MELBOURNE, VICTORIA, AUSTRALIA.

TEAT-CUP OF MILKING-MACHINES.

1,365,665.   Specification of Letters Patent.   Patented Jan. 18, 1921.

Application filed May 5, 1920. Serial No. 379,137.

*To all whom it may concern:*

Be it known that I, JOHN HENRY DAVIES, a subject of the King of Great Britain and Ireland, and a resident of the city of Melbourne, in the county of Bourke, State of Victoria, Commonwealth of Australia, (whose post-office address is 592 Bourke street, in the said city of Melbourne,) have invented certain new and useful Improvements Relating to the Teat-Cups of Milking-Machines, of which the following is a specification.

This invention relates to pneumatic milking machines, and in particular to teat cups and connections thereto. In the past, when a teat cup has fallen from a cow during milking operations, it has been necessary to turn the fallen cup over onto the claw in order to prevent the other teat cups from falling from the animal. The bending of the flexible tube or tubes supporting the teat cup cuts off communication with the atmosphere and prevents a temporary reduction of the vacuum. The same movement has, for a similar reason, been found advisable before applying the teat cups to the animal.

The continuous bending or pinching of the tubes has diminished the life thereof leading to excessive cost in maintenance. In addition, careful attention on the part of the operator has been necessary to prevent or to remedy any disconnection of a teat cup. To overcome the objections referred to, it has become the practice to provide the claw of a machine with devices whereby the source of vacuum to each teat cup is automatically and independently cut off until the particular cup concerned is elevated for connection to the teat of the cow. By the same means, a similar result is obtained before any of the teat cups are attached to the animal.

The present invention contemplates a connection applicable direct to the teat cup whereby the source of vacuum to each cup may be automatically and independently cut off until the particular teat cup concerned is elevated for connection to the animal.

By the invention, which is of an extremely simple and convenient nature, the automatic cut off mechanism may also be applied to the cups of existing milking machines without altering or interfering with the claws thereof. The invention is applicable to a variety of forms of teat cups and may be adapted to certain classes of teat cups of existing machines at a minimum of expense.

It is to be distinctly understood that the invention is not limited for use in connection with any particular teat cup, and although in the following description a special type of teat cup is described in detail, the invention may be used with equal advantage upon many other types. It is also to be understood that the term "vacuum" when used herein is to be construed as having the meaning understood in connection with milking machinery, and that the term "rotary plug" is to be likewise construed as the plug shown herein does not rotate.

Referring to the drawings which form part of this specification:—

Figure 1 is a sectional view showing the invention applied to a known type of teat cup.

Fig. 2 is an end elevation of a closure, a tapered plug being removed.

Fig. 3 is a plan of Fig. 2.

Fig. 4 is an end elevation of a tapered plug.

Fig. 5 is a side elevation of Fig. 4.

Fig. 6 is an end sectional elevation of the closure, the tapered plug being in position.

Fig. 7 is a plan on line A—A Fig. 1.

Fig. 8 is a side elevation showing one form of the invention for use with teat cups having milk discharge and pulsation nipples.

Fig. 9 is a modification of the invention wherein an annular groove is formed in the closure instead of in the flexible inner tube of the teat cup.

Fig. 10 is a sectional view of a modification wherein in the event of leakage milk does not pass to the pulsation passages.

Fig. 11 is an end elevation of a closure having an air passage therein to prevent leakage of milk into the pulsation passages.

Fig. 12 is a plan of Fig. 11.

Fig. 13 is an end elevation of a closure wherein the suction and pulsation nipples are bent or curved.

Fig. 14 is a sectional view showing the closure seen in Fig. 11 in position.

Fig. 15 is a detail view showing the application of the invention to that class of teat cup wherein it is convenient to provide separate cut-off mechanism for the milk discharge and pulsation nipples of the teat cup.

A teat cup according to the invention may comprise a metallic casing 2 and the usual central flexible inner tube 3 which fits on to the teat of the cow. The upper end of this central flexible inner tube 3 is folded over the top of the metallic outer casing as at 4 and is protected by a cap 5. An internal annular groove indicated at 6 is formed in the inner surface of the inner flexible central tube 3 which latter also has a series of vertical grooves indicated at 7 in its outer surface. The grooves 7 communicate by means of holes or apertures indicated at 8, spaced at suitable distances apart, with the groove 6 and with a series of external vertical flats 9 formed on the outer surface of the said tube 3. Coinciding with the flats 9 is a series of internal vertical protuberances 10. The walls of the tube 3 including the vertical flats 9 and protuberances 10 vary in thickness being thinner near the upper end and gradually increasing in thickness as they approach the lower end in order that a maximum pressure may be obtained near the top of the teat, the pressure gradually diminishing as it approaches the lower end. By this means an effective pulsating action is obtained which has been found most desirable in milking by machinery.

The lower end of the flexible inner tube 3 has an external collar 11 encircling a circular hole to accommodate an upwardly tapered closure hereinafter described.

Accommodated in the circular hole at the lower end of the tube 3 is an upwardly tapered closure 12 having formed in its upper end a cup indicated at 13. The closure is also provided with a vertical milk discharge hole indicated at 14. Formed in the closure is a pulsation port indicated at 15. This communicates with the internal annular groove 6 in the inner surface of the tube 3. The milk discharge hole 14 and pulsation port 15 pass through the closure to the bottom thereof. Integral with the lower end of the closure is an open ended tapered plug casing 16 having therein a mouth or passageway indicated at 17. The sides 18 of the passageway form limit stops.

Disposed within the casing 16 is a tapered rotary plug 19 having therein a milk or suction port indicated at 20 and a pulsation port indicated at 21. The ports 20 and 21 are adapted to communicate when the teat cup is in active use, with the discharge hole 14 and pulsation port 15 of the closure. Each of the said ports 20 and 21 also communicates permanently with a suction nipple 22 and a pulsation nipple 23. The nipples 22 and 23 are disposed at an angle to the plug 19 as seen in Fig. 6. They may be curved or bent as seen in Figs. 13 to 15 the object in either case being to exert such a leverage as will cause a positive "cut-off" when a teat cup falls from its milking or operative position, a plug having vertically disposed nipples would be liable to fall in action. The nipples by flexible suction tubing 24 and flexible pulsation tubing 25 are connected to a claw of any suitable or usual type. Formed upon the rotary plug 19 is a reduced portion or shoulder 24ª having a portion cut away as at 25ª. Extending beyond the shoulder 24ª is a reduced threaded end 26. Disposed upon the shoulder 24ª is a washer 27 bearing upon which is a nut 28 threaded upon the reduced end 26. The closure 12 and casing 16 thereof are capable of a partial rotary movement in relation to the rotary plug 19 whereby communication may be opened or closed between the corresponding passages or ports of the closure and the rotary plug according to the relative positions thereof. The angular arrangement of the nipples 22 and 23 causes positive action as before mentioned. The rotary plug, the casing supporting the same, and the milk and pulsation connections may be modified to suit requirements. It will also be seen that the ports or passages in the rotary plug are free from objectionable bends (which are difficult to cleanse with a brush) particularly when the nipples are curved.

Instead of the teat cup being of the character described it may be of any suitable form. Further in some instances the closure 12 may be dispensed with and the rotary plug 19 and its appurtenances connected directly to the base of the teat cup or to nipples or tubes leading therefrom. Some forms of teat cups have a discharge nipple and a pulsation nipple connected to or formed integral with the teat cup. To apply the invention to a teat cup of this character, the said nipples, indicated at 26ª and 27ª in Fig. 8 of the drawings, are connected to the circular casing 16 carrying the rotary plug 19, the said casing having the milk discharge hole 14 and pulsation port 15 formed therein to communicate with the said nipples. The movement of the casing relative to the ports in the rotary plug makes or breaks communication in the manner described and as is obvious from the drawings.

According to a further modification the internal annular groove 6 in the interior of the inner central flexible tube 3 may be dispensed with and the said annular groove formed in the outer surface of the closure 12 as indicated in Fig. 9 of the drawings.

Further, an additional annular groove indicated at 28ª may be formed in the interior of the central flexible tube 3 as indicated in Fig. 10, or it may be formed in the outer surface of the closure 12. The additional groove 28ª communicates by a suitable passage, indicated at 29, with a passage, indicated at 30, formed in the metallic casing 2. Or a passage 31 may be formed in the closure, as seen in Figs. 11, 12 and 14, instead of communicating by the passages 29 and 30. The groove 28ª thus communicates with the atmosphere and prevents milk being drawn into the pulsation ports in the event of leakage.

With a milking machine fitted with teat cups according to the present invention, no detrimental effect or breaking down of the vacuum can take place should a teat cup fall from a cow, for the reason that the weight of the teat cup causes the circular casing 16 around the rotary plug 19 to partially rotate thereon or vice versa, thus breaking communication between the teat cup and the ports in the rotary plug. As soon as the teat cups are elevated, however into an approximately vertical position communication is restored and milking operations may be commenced or continued.

Instead of a single rotary plug and casing being applied to each teat cup, two separate rotary plugs and casings may be provided as shown in Fig. 15, one of the said plugs having a milk port 32 and nipple 33 for connection to the flexible milk tubing 24, and the other a pulsation port 34 and nipple 35 for connection to the flexible pulsation tubing 25.

Primarily, the invention contemplates improvements in teat cups including the attachment of a simple and particularly effective automatic cut-off mechanism directly to a teat cup, a feature of the invention residing in the fact that the various ports form perfectly straight passages to and from the teat cup thereby eliminating objectionable bends and facilitating cleansing. By the angular arrangement of the milk and pulsation nipples rotary movement of the device is made certain.

Having now described my invention what I claim as new and desire to secure by Letters Patent is:—

1. Improvements relating to the teat cups of pneumatic milking machines, consisting in a tapered closure, having a rotary casing, and a tapered rotary plug mounted in said casing, said casing and plug having corresponding milk and pulsation passages formed therein.

2. Improvements relating to the teat cups of milking machines, consisting in the combination with a teat cup having a flexible inner tube open at its lower end, of a tapered closure, a plug casing carried by the closure, a rotary plug disposed within the casing, said casing and plug having suction and pulsation passages formed therein, and pulsation and suction nipples carried by the plug.

3. In a pneumatic teat cup cut-off mechanism having suction and pulsation passages formed therein, suction and pulsation nipples communicating with said passages and angularly disposed in relation to the teat cup when it is in operative position.

4. Improvements relating to the teat cups of milking machines, consisting in the combination with a teat cup having an inner flexible tube, of an upwardly tapered closure disposed at the lower end of said tube, said closure having a cup formed at its upper end and having formed therein a milk discharge hole and a pulsation port, a tapered plug casing carried by the closure, said casing having an open ended mouth or passageway the sides of which form limit stops, a tapered rotary plug disposed within the casing, said plug having a milk and a pulsation port formed therein, and suction and pulsation nipples carried by the plug and passing through the mouth or passageway of the casing and engaging the sides or limit stops thereof upon the teat cup falling or being elevated to operative position.

5. Improvements relating to the teat cups of milking machines, consisting in the combination with a teat cup having a milk discharge nipple and a pulsation nipple, of a tapered plug casing having a milk port and a pulsation port communicating with the nipples, said casing having a mouth or passageway formed therein, a rotary tapered plug disposed within the casing, said plug having a milk port and a pulsation port formed therein, and suction and pulsation nipples carried by the plug and passing through the mouth or passageway of the casing.

6. Improvements relating to the teat cups of milking machines, consisting in the combination with a teat cup having an open ended flexible inner tube, of a closure having an annular groove formed therein, and a cut-off mechanism carried by the closure.

7. A pneumatic teat cup having, in combination, a milk and a pulsation port and an annular groove disposed between the ports and communicating with the atmosphere.

8. Improvements relating to the teat cups of milking machines, consisting in a teat cup having a cut-off mechanism provided with milk and pulsation ports, and means for preventing milk leakage communicating with the pulsation port of the mechanism.

9. Improvements relating to the teat cups of milking machines, consisting in the combination with a teat cup having an open ended flexible inner tube, of a closure and a cut-off mechanism provided with milk and pulsation ports, said flexible tube having an annular groove formed therein for the purpose of preventing milk passing to the pulsation ports in the event of leakage.

10. Improvements relating to the teat cups of milking machines, consisting in the combination with a teat cup having an open ended flexible inner tube, of a closure and a cut-off mechanism provided with milk and pulsation ports, said flexible tube having an annular groove formed therein, and said closure having a passage formed therein to communicate with the annular groove and the atmosphere.

11. Improvements relating to the teat cups of pneumatic milking machines, consisting in the combination with a teat cup having a milk discharge nipple and a pulsation nipple of a separate tapered plug casing for each nipple, each casing having a port therein, communicating with its relative nipple, a rotary plug disposed in each casing, said plug having a port formed therein and a nipple carried by each plug communicating with the port thereof.

In testimony whereof I affix my signature.

J. H. DAVIES.

Witness:
  CECIL W. LE PLASTRIER.